(12) United States Patent
Ji et al.

(10) Patent No.: US 12,531,499 B2
(45) Date of Patent: *Jan. 20, 2026

(54) CONTROL METHOD FOR VECTOR FLUX WEAKENING FOR VEHICLE PERMANENT MAGNET SYNCHRONOUS MOTOR

(71) Applicant: Zhejiang University City College, Zhejiang (CN)

(72) Inventors: Feifan Ji, Hangzhou (CN); Jing Li, Hangzhou (CN); Yuwei Chen, Hangzhou (CN)

(73) Assignee: Zhejiang University City College, Hangzhou (CN)

(*) Notice: Subject to any disclaimer, the term of this patent is extended or adjusted under 35 U.S.C. 154(b) by 436 days.

This patent is subject to a terminal disclaimer.

(21) Appl. No.: 17/841,596

(22) Filed: Jun. 15, 2022

(65) Prior Publication Data

US 2022/0311367 A1    Sep. 29, 2022

Related U.S. Application Data

(63) Continuation of application No. PCT/CN2022/070785, filed on Jan. 7, 2022.

(30) Foreign Application Priority Data

Mar. 22, 2021 (CN) .......................... 202110299962.1

(51) Int. Cl.
*H02P 5/68* (2006.01)
*H02P 21/00* (2016.01)
(Continued)

(52) U.S. Cl.
CPC .......... *H02P 21/26* (2016.02); *H02P 21/0089* (2013.01); *H02P 21/141* (2013.01)

(58) Field of Classification Search
CPC ...... H02P 21/0089; H02P 21/06; H02P 27/08; H02P 21/22; H02P 27/06; H02P 5/74;
(Continued)

(56) References Cited

U.S. PATENT DOCUMENTS

| 2010/0066283 A1* | 3/2010 | Kitanaka ................... H02P 4/00 318/400.02 |
| 2011/0118937 A1 | 5/2011 | Kariatsumari et al. |

FOREIGN PATENT DOCUMENTS

| CN | 103988419 A | 8/2014 |
| CN | 106357182 A | 1/2017 |

(Continued)

OTHER PUBLICATIONS

First Office Action(JP2022529424); Date of Mailing: Jun. 16, 2023.
(Continued)

*Primary Examiner* — Kawing Chan
*Assistant Examiner* — Charles S Laughlin
(74) *Attorney, Agent, or Firm* — Wiersch Law Group

(57) ABSTRACT

Disclosed is a vector flux weakening control method for vector flux weakening for a vehicle permanent magnet synchronous motor, which includes a current closed-loop adjuster, a modulation ratio deviation calculator, a current command angle compensator, a current angle preset processor, a current command angle limiting comparator and a current given vector corrector. The adjusting direction of the present disclosure is always a flux weakening direction, and instability caused by repeated adjustment will not occur; by introducing dq current while performing correction, the pressure against voltage saturation can be shared to both d-axis and q-axis current, so as to avoid excessive output torque deviation caused by excessive adjustment of a single-axis current; the influence of the flux weakening control link on the output torque of the drive system can be minimized (Continued)

as much possible while ensuring the safety of the drive system.

10 Claims, 6 Drawing Sheets

(51) Int. Cl.
 *H02P 21/14* (2016.01)
 *H02P 21/26* (2016.01)
(58) Field of Classification Search
 CPC .... H02P 6/08; H02P 21/0003; H02P 2201/09; H02P 6/18; H02P 21/00; H02P 21/05; H02P 21/0085; H02P 21/18; H02P 2201/07; H02P 2207/05; H02P 25/024; H02P 27/04; H02P 6/007; H02P 6/06; H02P 6/14; H02P 6/28; H02P 2006/045; H02P 21/0021; H02P 21/02; H02P 21/26; H02P 21/34; H02P 2203/05; H02P 2203/09; H02P 2209/13; H02P 23/0004; H02P 23/009; H02P 4/00; H02P 5/68; H02P 6/153; H02P 6/183; H02P 21/0025; H02P 21/141; H02P 21/20; H02P 21/36; H02P 2205/01; H02P 2207/01; H02P 27/085; H02P 6/181
 See application file for complete search history.

(56) References Cited

FOREIGN PATENT DOCUMENTS

| | | |
|---|---|---|
| CN | 109155606 A | 1/2019 |
| CN | 111277182 A | 6/2020 |
| CN | 111711394 A | 9/2020 |
| CN | 112688610 A | 4/2021 |
| EP | 3168979 A1 | 5/2017 |
| JP | 2001286110 A | 10/2001 |
| JP | 2017154563 A | 9/2017 |
| JP | 2021035220 A | 3/2021 |

OTHER PUBLICATIONS

International Search Report (PCT/CN2022/070785); Date of Mailing: Mar. 28, 2022.
CN First Office Action(202110299962.1); Date of Mailing: Apr. 25, 2021.

* cited by examiner

CONTROL METHOD FOR VECTOR FLUX WEAKENING FOR VEHICLE PERMANENT MAGNET SYNCHRONOUS MOTOR

CROSS-REFERENCE TO RELATED APPLICATIONS

The present application is a continuation of International Application No. PCT/CN2022/070785, filed on Jan. 7, 2022, which claims priority to Chinese Application No. 202110299962.1, filed on Mar. 22, 2021, the contents of both of which are incorporated herein by reference in their entireties.

TECHNICAL FIELD

The present disclosure belongs to the field of permanent magnet synchronous motor control, and in particular relates to a control method for vector flux weakening for a vehicle permanent magnet synchronous motor.

BACKGROUND

In the control system of the interior permanent magnet synchronous motor (IPMSM) for vehicles, the controlled object, IPMSM, inevitably changes in the actual application scene, resulting in the failure of the pre-solidified control parameters in the control program, leading to voltage saturation caused by insufficient flux weakening during a high-speed operation of the motor and endangering the stability of the motor drive system.

IPMSM has the characteristics of a high power density, a wide operating range and a high efficiency, so it is widely used as the driving motor of electric vehicles. The torque equation is:

$$T_e = 1.5 P_n (\varphi_f i_q + (L_d - L_q) i_d i_q) \quad (1)$$

where $T_e$ is the electromagnetic torque of a motor; $P_n$ is the number of pole pairs of the motor; $\varphi_f$ is the magnetic flux of a rotor permanent magnet; $i_q$ is the q-axis current, $i_d$ is the d-axis current; $L_d$ is the d-axis inductance; $L_q$ is the q-axis inductance; in the normal driving process of IPMSM, $T_e > 0$, $i_q > 0$, $i_d < 0$, $L_d < L_q$.

It can be seen from the above formula that the torque is positively correlated with the current, but different combinations of d-axis and q-axis current will correspond to different torques, and each fixed current amplitude will have a set of specific dq current combinations to enable the motor to output the maximum torque at this current. Due to the saturation of a magnetic field, the inductance $L_d$ and $L_q$ of d-axis and q-axis will change with the change of current when the current is larger than a certain range, and the change range can be as much as 200%. The changes of these parameters make it very difficult or even infeasible to solve the optimal dq current combination at each current online. Therefore, in vehicle motor control, the optimal current combination corresponding to each torque is generally obtained through experimental tests and calibrations. The line connected by all such current combinations in the whole torque range is called the MTPA curve of the IPMSM.

In addition, the operation of IPMSM for vehicles depends on the inverter converting the DC bus of a power battery into three-phase AC, which means that the terminal voltage of motor is constrained by the DC bus; the voltage equation of the IPMSM is:

$$V_d = i_d R_s + L_d \frac{di_d}{dt} - \omega L_q i_q \quad (2)$$

$$V_q = i_q R_s + L_q \frac{di_q}{dt} + \omega(\varphi_f + L_d i_d)$$

where $V_d$ is the d-axis voltage of the motor and $V_q$ is the q-axis voltage of the motor; $R_s$ is the stator resistance and ω is the rotor electrical angular speed In a steady state with a high speed, the amplitude of the terminal voltage of the motor is approximately as follows:

$$|V_s| = \omega \sqrt{(L_q i_q)^2 + (\varphi_f + L_d i_d)^2} \quad (3)$$

when the motor speed increases, the terminal voltage of the motor increases, and when it exceeds the amplitude of the AC voltage provided by the bus voltage, it is necessary to carry out flux weakening control, and the maximum AC voltage that can be provided by the current bus is the voltage limit $V_{s\_lmt}$, with the general expression as follows $$V_{s\_lmt} = V_{dc} \cdot MI_{max} / \sqrt{3}$$

where $V_{dc}$ is the bus voltage, $MI_{max}$ is the maximum modulation ratio of the motor control system, the value of which is generally around 1, with a maximum of 1.1027.

In order to obtain the current combination which can satisfy the torque equation and the voltage limit, the dq current combination corresponding to each torque at different buses and rotating speeds is still calibrated by experimental means. Then these data are tabulated and stored in a digital control chip. When the motor is running in real time, the torque commands at different speeds and bus voltages are converted into corresponding dq current commands by looking up the table.

The premise that the above process can work normally is that the current combination obtained through the experimental calibration of the prototype can be applied to each motor of the same model; however, in practical applications, there are the following aspects that will make this assumption no longer valid:

1. When the motors are produced in batches, the process and materials will inevitably lead to the inconsistency of the motors.
2. When the rotation offset of the motor is deviated, even when the current regulator works normally, it will lead to the deviation of the magnetic field orientation on the control, and then the actual dq current in the motor is inconsistent with the expected current command.
3. The change of ambient temperature will affect the permanent magnet flux linkage; when the temperature decreases, $\varphi_f$ will increase, resulting in that the calibrated dq current command no longer meets the voltage limit.

Therefore, in order to enhance the robustness of the electric drive control system in the high-speed operation area, the flux weakening control link is generally added.

Patent document CN101855825B puts forward a representative solution to the problem of motor control flux weakening. As shown in FIG. 1, the voltage deviation is obtained according to the difference between the output voltage of the current regulator and the voltage limit, and a current correction $\Delta I_d$ obtained from this deviation through proportional link (PI) is superimposed on the d-axis current, and the upper limit of this correction is limited to 0, so as to deepen the flux weakening and achieve the purpose of flux weakening control. According to formula (3), when $(\varphi_f + L_d i_d) > 0$, increasing the $i_d$ in the negative direction can reduce the output voltage, that is, this solution is effective; however, when $(\varphi_f+L_d i_d)<0$, if the $i_d$ continues to increase in the negative direction, the reverse increase of $V_q$ will lead to further increase of the output voltage, which will lead to more serious voltage saturation. Therefore, when using this method, $(\varphi_f+L_d i_d)>0$ has to be ensured. However, in vehicle motor control, if this restriction is added, the reluctance torque of the motor in a high-speed area will not be fully utilized, and the performance of the motor will be sacrificed. Using the method of reducing $i_d$ in the above solution when the voltage is saturated can deepen the weak magnetic field and make the motor exit the voltage saturation state. However, this method has a great influence on the output torque, because only by correcting $i_d$, a large amount of $i_d$ correction is needed, and the dq current combination changes greatly, which even has a great influence on the output torque. Non-patent literature (T. M. Jahns, "Flux Weakening Regime Operation of an Interior Permanent-Magnet Synchronous Motor Drive", IEEE Trans. on Ind. Appl., vol. IA-23, no. 4, pp. 55-63, 1987) proposed a method to reduce $i_q$ in a weak magnetic region, but only adjusting a single current also faced the problem of great influence on the output torque. At present, no better existing technology has been found to be able to effectively deal with the voltage saturation problem while having little impact on the output torque as much as possible.

SUMMARY

In view of the shortcomings of the prior art, the purpose of the present disclosure is to provide a control method for vector flux weakening for a vehicle permanent magnet synchronous motor.

The purpose of the present disclosure is realized through the following technical solution: a control method for vector flux weakening for a vehicle permanent magnet synchronous motor, including a current closed-loop adjuster, a modulation ratio deviation calculator, a current command angle compensator, a current angle preset processor, a current command angle limiting comparator and a current given vector corrector.

An input of the current closed-loop adjuster is a dq current command output by the current given vector corrector, and after passing through a proportional-integral controller, a dq voltage command is output.

An input of the modulation ratio deviation calculator is the dq voltage command output by the current closed-loop adjuster; after an expected modulation ratio $MI_{ref}$ is obtained by solving a square root of a sum of squares, a difference between the expected modulation ratio and an expected maximum modulation ratio $MI_{max}$ of a control system is calculated, and after passing through the low-pass filter, a modulation ratio deviation $\Delta MI$ is output.

An input of the current angle compensation module is the modulation ratio deviation output by the modulation ratio deviation calculator, and after passing through a proportional-integral compensator, a correction angle delta $\Delta\theta$ is output.

The current angle preset processor is configured to preset a current angle $\theta_{pre}$.

The current command angle limiting comparator is configured to limit the current angle compensated by the correction angle output by the current command angle compensator to be above the current angle preset by the current angle preset processor.

The given current vector correction module is configured to calculate dq current commands $i_{dref}$ and $i_{qref}$ after flux weakening control based on the current angle preset by the current angle preset processor.

Further, in the current closed-loop adjuster, the dq voltage command is obtained from a deviation of the dq current commands $i_{dref}$, $i_{qref}$ and a dq current feedback respectively through the proportional-integral controller.

Further, in the modulation ratio deviation calculator, a difference $\Delta MI_0$ between $MI_{max}$ and $MI_{ref}$ is:

$$\Delta MI_0 = MI_{ref} - MI_{max}$$

$$MI_{ref} = \frac{\sqrt{3(v_{d\_ref}^2 + v_{q\_ref}^2)}}{V_{dc}}$$

where $v_{d\_ref}$ and $V_{q\_ref}$ are d-axis and q-axis voltage commands, and $V_{dc}$ is a bus voltage.

Further, in the current command angle compensator, the correction angle $\Delta\theta$ is:

$$\Delta\theta = \frac{k_p s + k_i}{s}\Delta MI$$

where $k_p$ and $k_i$ are proportional coefficient and integral coefficient of the proportional-integral compensator.

Further, the current angle preset processor limits the orientation of a motor by maximum torque per ampere (MTPA) current angle curve plotting, and the current angle $\theta_{pre}$ is presets.

Further, the current command angle limiting comparator is configured to limit the current angle to:

$$\theta+\Delta\theta \geq \theta_{pre}$$

where $\theta$ is the current angle before flux weakening control.

Further, in the given current vector correction module, the d-axis and q-axis current commands $i_{dref}$ and $i_{qref}$ are calculated:

$$\begin{cases} i_{qref} = |i|\cos(\theta + \Delta\theta) \\ i_{dref} = -|i|\sin(\theta + \Delta\theta) \end{cases} \theta + \Delta\theta > \theta_{pre}$$

$$\begin{cases} i_{qref} = |i|\cos(\theta_{pre}) \\ i_{dref} = -|i|\sin(\theta_{pre}) \end{cases} \text{else}$$

where |i| is the current before the flux weakening control.

The present disclosure has the following beneficial effects:
1. The adjusting direction of the present disclosure is always weak magnetic direction, and instability caused by repeated adjustment will not occur.
2. The present disclosure introduces the dq current and corrects it at the same time, which can share the pressure against voltage saturation to the dq current, and avoid excessive output torque deviation caused by excessive adjustment of a single-axis current.
3. The present disclosure reduces the influence of the flux weakening control link on the output torque of the drive system as much as possible while ensuring the safety of the drive system.

DESCRIPTION OF EMBODIMENTS

Figure 1:
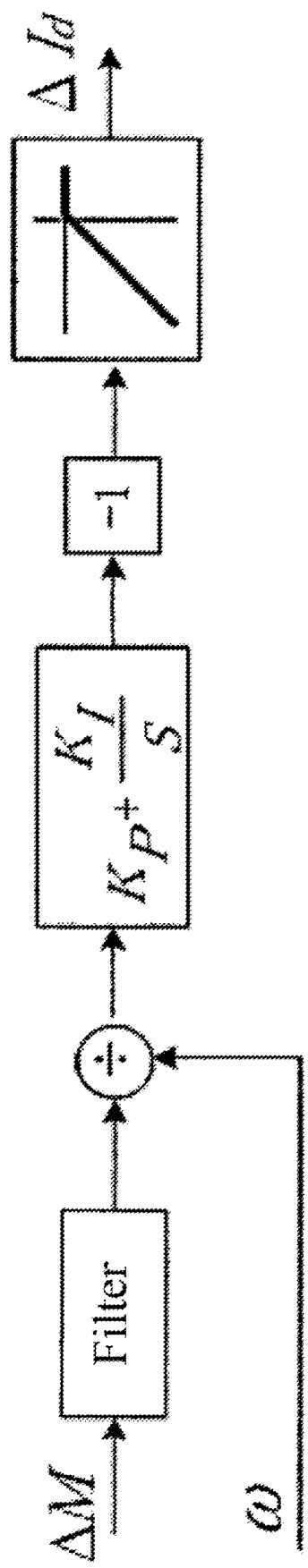
FIG. 1 is a topology block diagram of flux weakening control in the related art.
Figure 2:
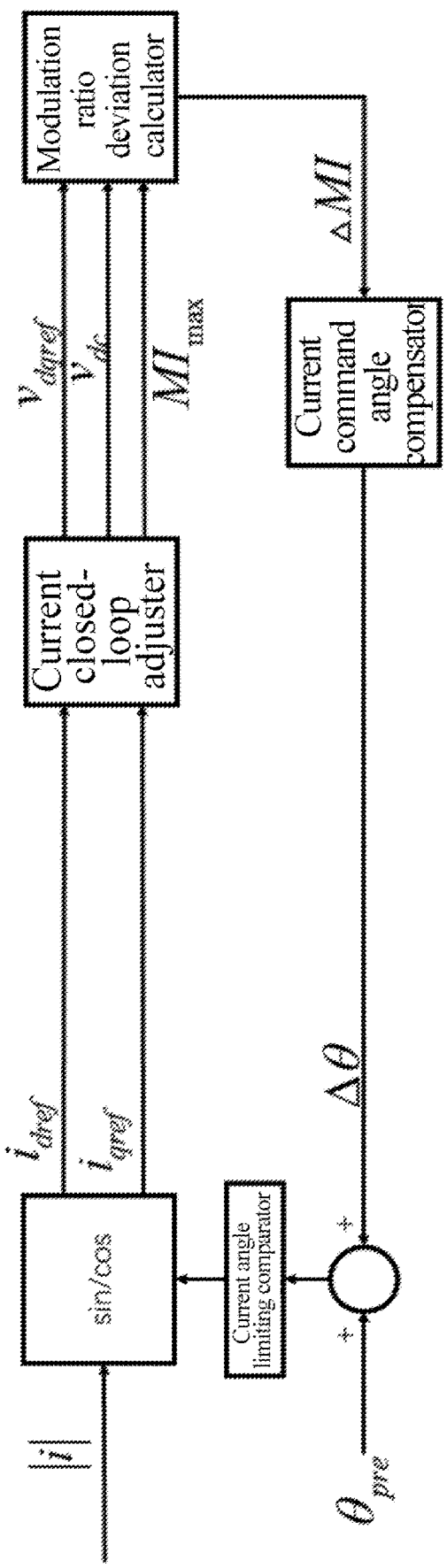
FIG. 2 is a block diagram of the overall topology according to the present disclosure.
Figure 3:
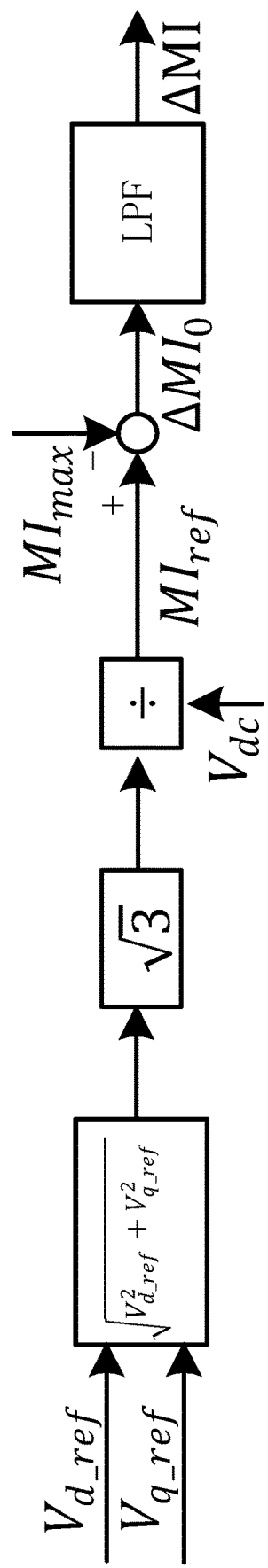
FIG. 3 is a schematic diagram of modulation ratio deviation calculation.

As shown in FIG. 2, the control method for vector flux weakening for a vehicle permanent magnet synchronous motor according to the present disclosure includes:
1. A current closed-loop adjuster: this part is the dependent module of the present disclosure, and its function is to obtain a dq voltage command $v_{dqref}$ from a deviation of the dq current commands $i_{dref}$, $i_{qref}$ and a dq current feedback respectively through the proportional-integral controller.
2. A modulation ratio deviation calculator: as shown in FIG. 3, $MI_{ref}$ is obtained by solving the square root of the sum of squares of dq voltage commands output by the current closed-loop adjuster:

$$MI_{ref} = \frac{\sqrt{3(v_{d\_ref}^2 + v_{q\_ref}^2)}}{V_{dc}}$$

where $v_{d\_ref}$ and $v_{q\_ref}$ are d-axis and q-axis components of $v_{dqref}$, and $V_{dc}$ is the bus voltage; then $\Delta MI_0$ is obtained by the difference between the expected maximum modulation ratio $MI_{max}$ of the control system and the expected modulation ratio $MI_{ref}$.

$$\Delta MI_0 = MI_{ref} - MI_{max}$$

Figure 4:
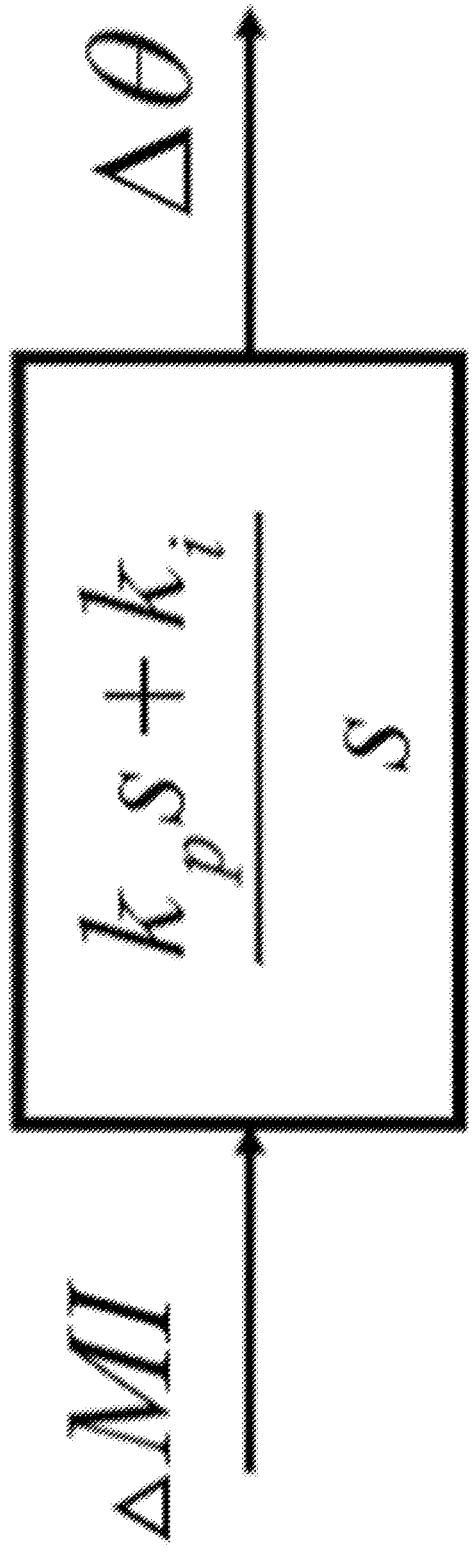
FIG. 4 is a schematic diagram of a current command angle compensator.
Figure 5:
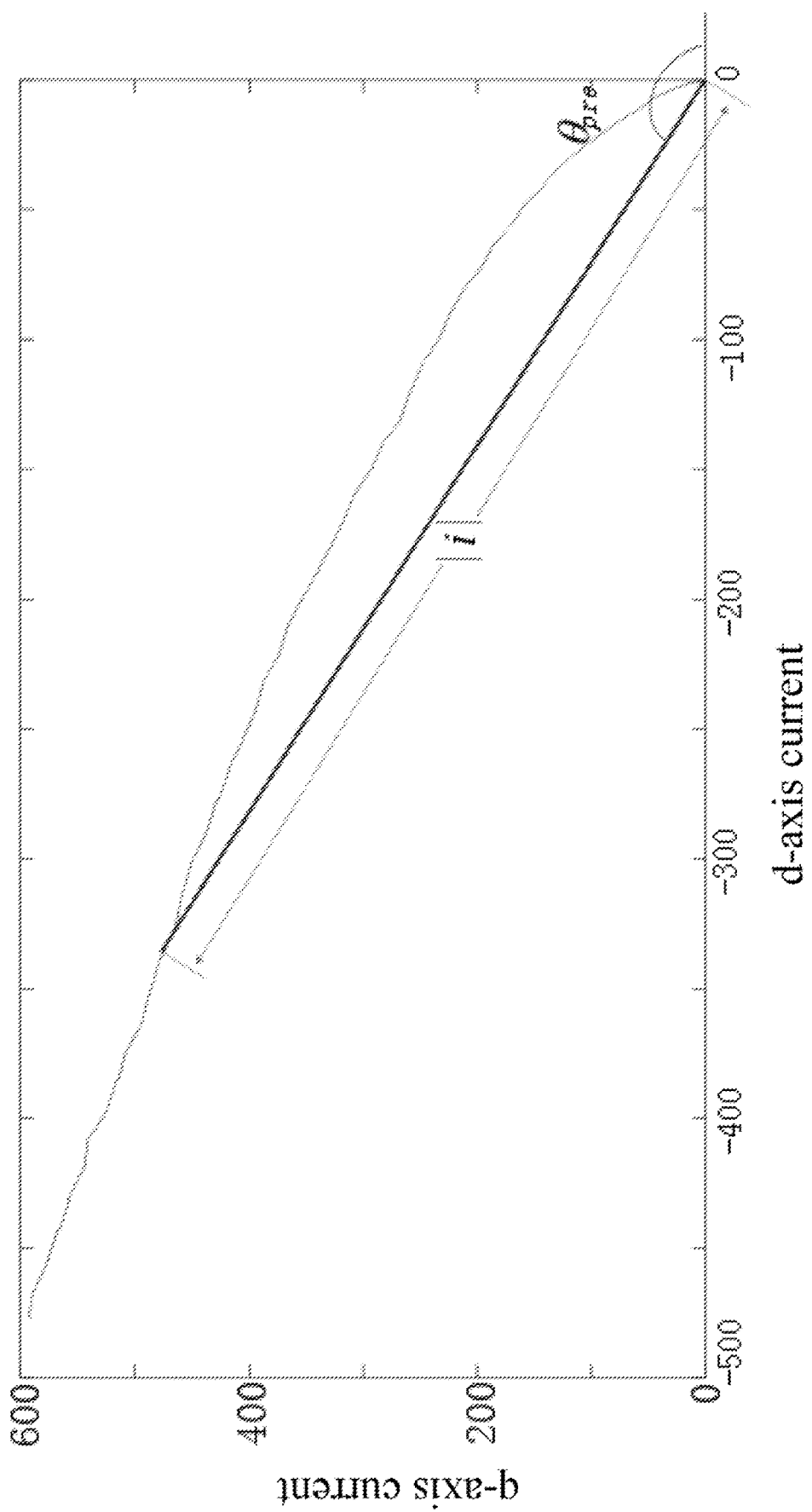
FIG. 5 is a schematic diagram of the current angle preset processor presetting an angle, where the unit of current is A.
Figure 6:
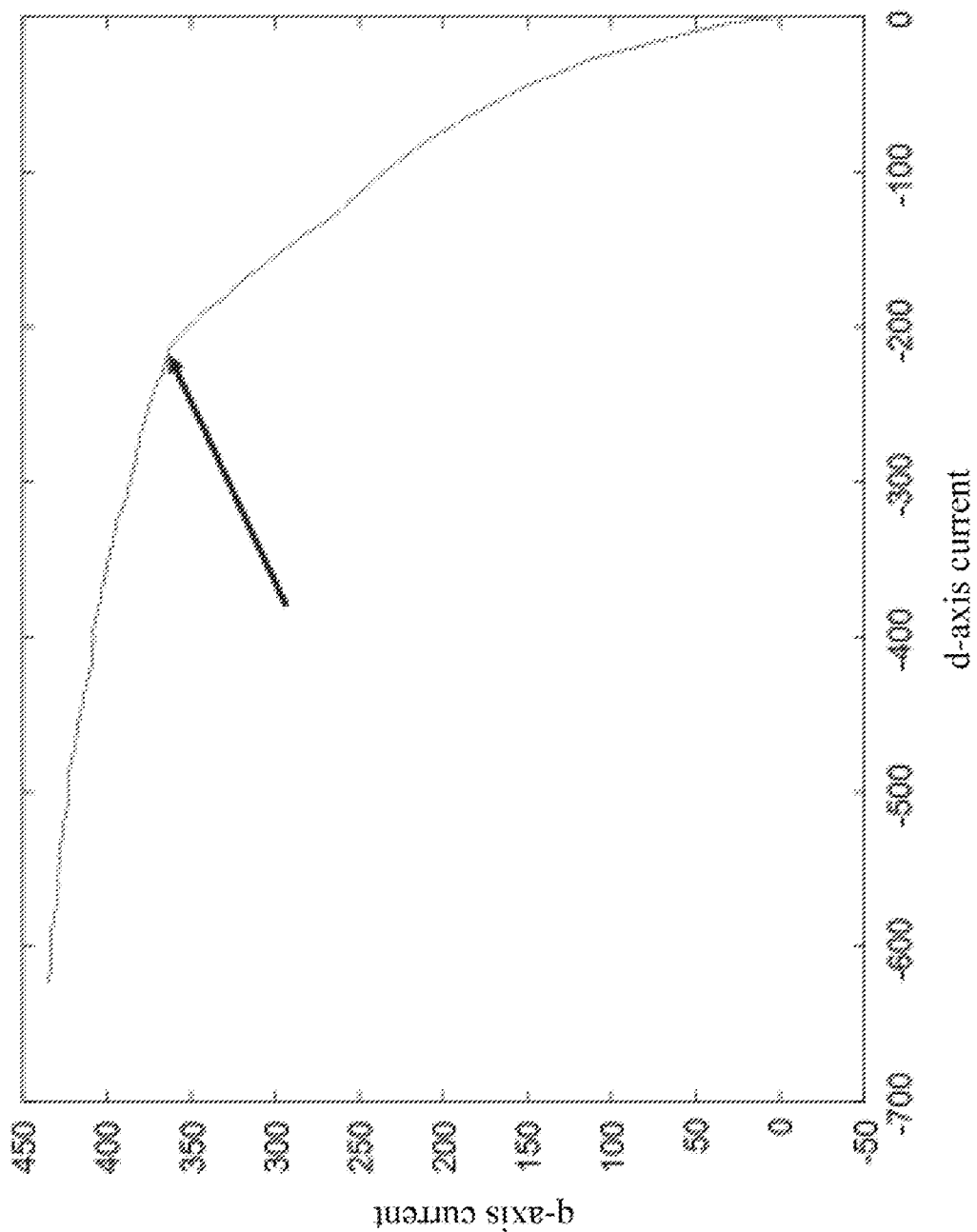
FIG. 6 is a schematic diagram of current angle correction in a weak magnetic region.
Figure 7:
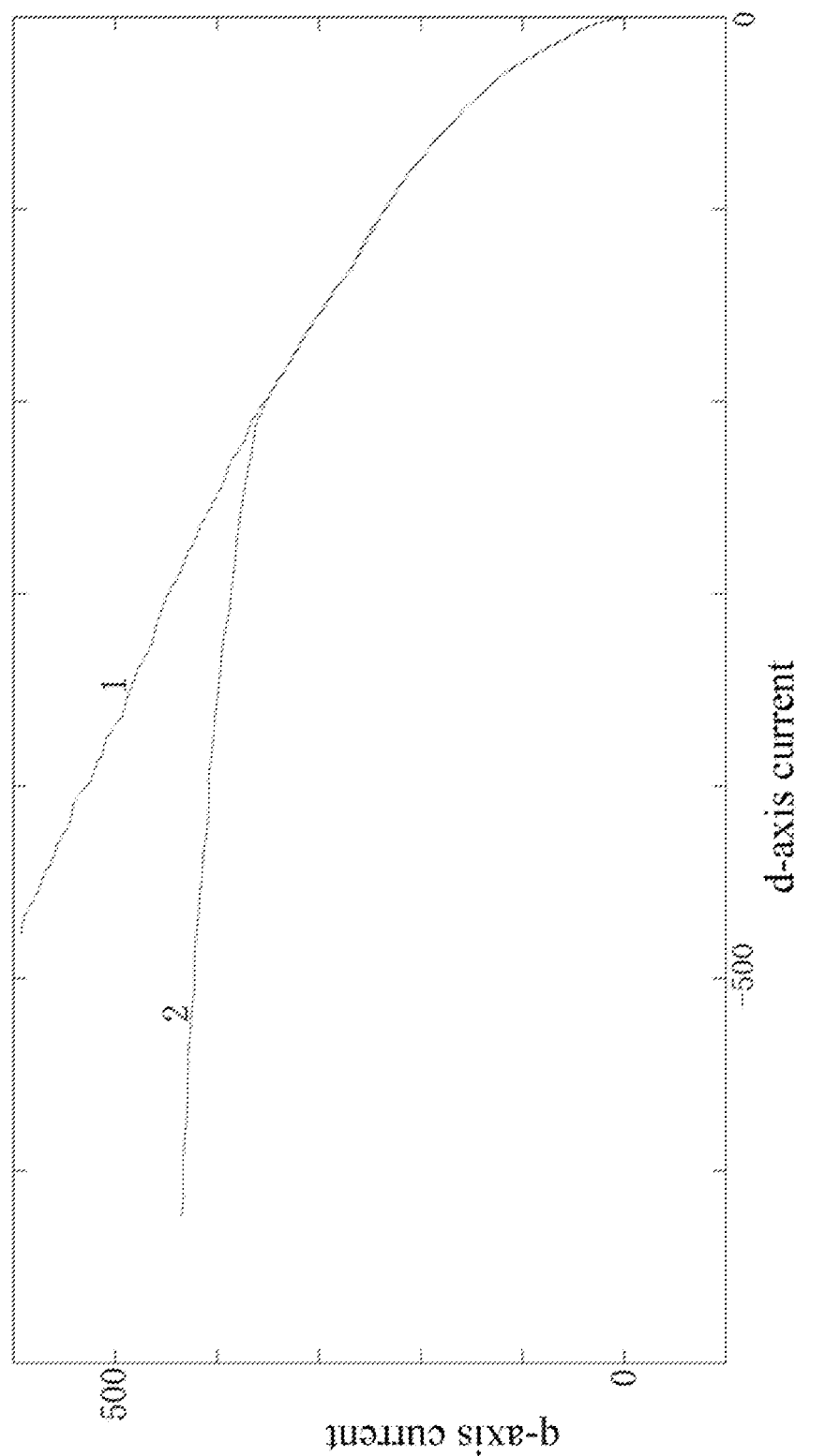
FIG. 7 is a schematic diagram of the change trend of a current angle before and after correction, 1 is before correction and 2 is after correction.
Figure 8:
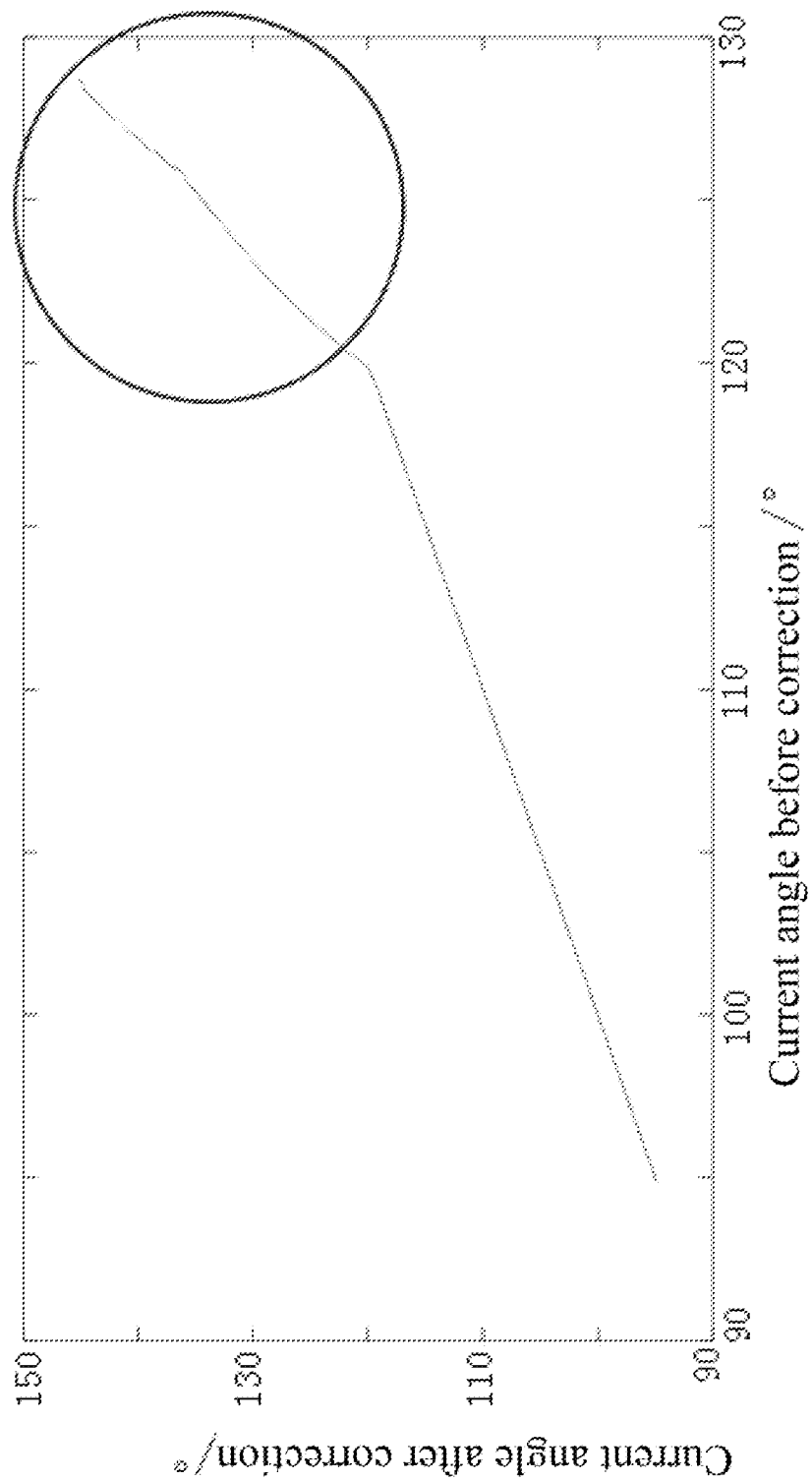
FIG. 8 is a comparison chart of current angles before and after correction.

The modulation ratio deviation $\Delta MI$ is obtained through a low-pass filter (LPF), the function of the low-pass filter is to remove the high-frequency noise in the dq current closed-loop regulating module, so that the output flux weakening control device can smooth the output current correction and prevent the motor torque from fluctuating greatly.
3. A current command angle compensator: as shown in FIG. 4, the output of the modulation ratio deviation calculator $\Delta MI$ is used as the input, and after passing through PI compensator, the output is the correction angle $\Delta \theta$:

$$\Delta \theta = \frac{k_p s + k_i}{s} \Delta MI$$

where $k_p$ and $k_i$ are the proportional coefficient and integral coefficient of the PI compensator.
4. A current angle preset processor: as shown in FIG. 5, the orientation of the standard motor is limited by maximum torque per ampere (MTPA) current angle curve plotting, a value is assigned at the MTPA (1000 rpm) of the dq current curve, and the current angle is preset as $\theta_{pre}$.
5. A current command angle limiting comparator: the angle compensated by the current command angle compensator is limited to be above the preset angle $\theta_{pre}$ of the current angle preset processor, $\theta + \Delta \theta \geq \theta$ pre; where $\theta$ is the angle of a current vector before flux weakening.
6. A current given vector corrector (sin/cos): combining with the current angle preset module, the current $i_{dref}$ and $i_{qref}$ of d-axis and q-axis after flux weakening are calculated as follows:

$$\begin{cases} i_{qref} = |i|\cos(\theta + \Delta\theta) \\ i_{dref} = -|i|\sin(\theta + \Delta\theta) \end{cases} \quad \theta + \Delta\theta > \theta_{pre}$$

$$\begin{cases} i_{qref} = |i|\cos(\theta_{pre}) \\ i_{dref} = -|i|\sin(\theta_{pre}) \end{cases} \quad \text{else}$$

where $|i|$ is the magnitude of a current vector before flux weakening. As shown in FIG. 6, from the flux weakening inflection point indicated by the arrow, the current command angle limiting comparator and the current given vector corrector start to function, and the dq current running curve changes correspondingly. As shown in FIG. 7, the current angle is automatically corrected in the weak magnetic field. As shown in FIG. 8, when the slope of the curve in the figure is not 1, it means that the actual angle is larger than the preset angle $\theta_{pre}$, and the current given vector corrector corrects the angle after 120°, and the circle shows the correction effect.

What is claimed is:
1. A control method for vector flux weakening for a vehicle permanent magnet synchronous motor, comprising:
a dq current command output by the current given vector corrector as an input of current closed-loop adjusting, and outputting, after passing through a proportional-integral controller, a dq voltage command;
taking the dq voltage command as an input of modulation ratio deviation calculating; obtaining an expected modulation ratio $MI_{ref}$ by solving a square root of a sum of squares, calculating a difference between the expected modulation ratio and an expected maximum modulation ratio $MI_{max}$ of a control system, and outputting, after passing through the low-pass filter, a modulation ratio deviation $\Delta MI$;
taking the modulation ratio deviation as an input of the current angle compensation, and outputting, after passing through a proportional-integral compensator, a correction angle $\Delta \theta$;
presetting a current angle $\theta_{pre}$;
limiting the current angle compensated by the correction angle output by the current command angle compensator to be above the preset current angle:

$$\theta + \Delta\theta \geq \theta_{pre}$$

where $\theta$ is the current angle before flux weakening control;
calculating d-axis and q-axis current commands $i_{dref}$ and $i_{qref}$ after flux weakening control based on the preset current angle:

$$\begin{cases} i_{qref} = |i|\cos(\theta + \Delta\theta) \\ i_{dref} = -|i|\sin(\theta + \Delta\theta) \end{cases} \theta + \Delta\theta > \theta_{pre}$$

$$\begin{cases} i_{qref} = |i|\cos(\theta_{pre}) \\ i_{dref} = -|i|\sin(\theta_{pre}) \end{cases} \text{else}$$

where |i| is a current before the flux weakening control; and driving the vehicle permanent magnet synchronous motor to rotate based on a torque determined by the d-axis and q-axis current commands $i_{dref}$ and $i_{qref}$.

2. The control method for vector flux weakening for a vehicle permanent magnet synchronous motor according to claim 1, wherein in the current closed-loop adjusting, the dq voltage command is obtained from a deviation of the d-axis and q-axis current commands $i_{dref}$, $i_{qref}$ and a dq current feedback respectively through the proportional-integral controller.

3. The control method for vector flux weakening for a vehicle permanent magnet synchronous motor according to claim 2, wherein in the modulation ratio deviation calculating, a difference $\Delta MI_0$ between $MI_{max}$ and $MI_{ref}$ is:

$$\Delta MI_0 = MI_{ref} - MI_{max}$$

$$MI_{ref} = \frac{\sqrt{3(v_{d\_ref}^2 + v_{q\_ref}^2)}}{V_{dc}}$$

where $v_{d\_ref}$ and $v_{q\_ref}$ are dq voltage commands, and $V_{dc}$ is a bus voltage.

4. The control method for vector flux weakening for a vehicle permanent magnet synchronous motor according to claim 3, wherein in the current command angle compensating, the correction angle $\Delta\theta$ is:

$$\Delta\theta = \frac{k_p s + k_i}{s} \Delta MI$$

where $k_p$ and $k_i$ are proportional coefficient and integral coefficient of the proportional-integral compensator, respectively.

5. The control method for vector flux weakening for a vehicle permanent magnet synchronous motor according to claim 4, wherein limits an orientation of the vehicle permanent magnet synchronous motor by maximum torque per ampere (MTPA) current angle curve plotting, and the current angle $\theta_{pre}$ is preset.

6. A control system for vector flux weakening for a vehicle permanent magnet synchronous motor, comprising a current closed-loop adjuster, a modulation ratio deviation calculator, a current command angle compensator, a current angle preset processor, a current command angle limiting comparator and a current given vector corrector;

wherein an input of the current closed-loop adjuster is a dq current command output by the current given vector corrector, and after passing through a proportional-integral controller, a dq voltage command is output;

an input of the modulation ratio deviation calculator is the dq voltage command output by the current closed-loop adjuster; after an expected modulation ratio $MI_{ref}$ is obtained by solving a square root of a sum of squares, a difference between the expected modulation ratio and an expected maximum modulation ratio $MI_{max}$ of a control system is calculated, and after passing through the low-pass filter, a modulation ratio deviation $\Delta MI$ is output;

an input of the current angle compensator is the modulation ratio deviation output by the modulation ratio deviation calculator, and after passing through a proportional-integral compensator, a correction angle $\Delta\theta$ is output;

the current angle preset processor is configured to preset a current angle $\theta_{pre}$;

the current command angle limiting comparator is configured to limit the current angle compensated by the correction angle output by the current command angle compensator to be above the current angle preset by the current angle preset processor:

$\theta + \Delta\theta \geq \theta_{pre}$ where $\theta$ is the current angle before flux weakening control; and the given current vector corrector is configured to:

calculate d-axis and q-axis current commands $i_{dref}$ and $i_{qref}$ after flux weakening control based on the current angle preset by the current angle preset processor:

$$\begin{cases} i_{qref} = |i|\cos(\theta + \Delta\theta) \\ i_{dref} = -|i|\sin(\theta + \Delta\theta) \end{cases} \theta + \Delta\theta > \theta_{pre}$$

$$\begin{cases} i_{qref} = |i|\cos(\theta_{pre}) \\ i_{dref} = -|i|\sin(\theta_{pre}) \end{cases} \text{else}$$

where |i| is a current before the flux weakening control; and to drive the vehicle permanent magnet synchronous motor to rotate based on a torque determined by the d-axis and q-axis current commands $i_{dref}$ and $i_{qref}$.

7. The control method for vector flux weakening for a vehicle permanent magnet synchronous motor according to claim 1, wherein in the current closed-loop adjuster, the dq voltage command is obtained from a deviation of the d-axis and q-axis current commands $i_{dref}$, $i_{qref}$ and a dq current feedback respectively through the proportional-integral controller.

8. The control method for vector flux weakening for a vehicle permanent magnet synchronous motor according to claim 2, wherein in the modulation ratio deviation calculator, a difference $\Delta MI_0$ between $MI_{max}$ and $MI_{ref}$ is:

$\Delta MI_0 = MI_{ref} - MI_{max}$ where $v_{d\_ref}$ and $v_{q\_ref}$ are dq voltage commands, and $V_{dc}$ is a bus voltage.

9. The control method for vector flux weakening for a vehicle permanent magnet synchronous motor according to claim 3, wherein in the current command angle compensator, the correction angle $\Delta\theta$ is:

where $k_p$ and $k_i$ are proportional coefficient and integral coefficient of the proportional-integral compensator, respectively.

10. The control method for vector flux weakening for a vehicle permanent magnet synchronous motor according to claim 4, wherein the current angle preset processor limits an orientation of the vehicle permanent magnet synchronous motor by maximum torque per ampere (MTPA) current angle curve plotting, and the current angle $\theta_{pre}$ is preset.

* * * * *